US005949456A

United States Patent [19]

Matsumoto et al.

[11] Patent Number: 5,949,456

[45] Date of Patent: Sep. 7, 1999

[54] VALVE FOR RECORDING LIQUID SUPPLY PORT

[75] Inventors: Hidehisa Matsumoto, Kawasaki, Japan; Toshiaki Sasaki, Irvine, Calif.

[73] Assignee: Canon Kabushiki Kaisha, Tokyo, Japan

[21] Appl. No.: 08/811,283

[22] Filed: Mar. 4, 1997

[30] Foreign Application Priority Data

Mar. 7, 1996 [JP] Japan .................................... 8-050065

[51] Int. Cl.[6] ................................................ G01D 15/16

[52] U.S. Cl. ........................................ 347/85; 251/149.1

[58] Field of Search ................................ 347/84, 85, 86, 347/87; 251/149.1, 149.6

[56] References Cited

U.S. PATENT DOCUMENTS

| | | | |
|---|---|---|---|
| 3,825,222 | 7/1974 | Petrova | 251/149.6 |
| 3,941,149 | 3/1976 | Mittleman | 137/493 |
| 4,677,447 | 6/1987 | Nielsen | 347/37 |
| 4,760,409 | 7/1988 | Kiyohara et al. | 347/6 |
| 5,127,616 | 7/1992 | Hilal et al. | 251/149.1 |
| 5,500,665 | 3/1996 | Ujita et al. | 347/86 |

FOREIGN PATENT DOCUMENTS

| | | | |
|---|---|---|---|
| 0 498 275 | 8/1992 | European Pat. Off. . | |
| 30 03 398 | 8/1980 | Germany . | |
| 2 264 997 | 9/1993 | United Kingdom . | |
| WO89/01104 | 2/1989 | WIPO | F16K 15/14 |

*Primary Examiner*—N. Le
*Assistant Examiner*—Anh T. N. Vo
*Attorney, Agent, or Firm*—Fitzpatrick, Cella, Harper & Scinto

[57] ABSTRACT

A valve member for a recording liquid supply port is connected to a liquid ejection recording means for supplying recording liquid to said liquid ejecting means, comprises an elastically deformable plate-like member; a plug member on one side of said plate-like member; a supporting member for supporting said plate-like portion on said liquid container, said supporting member being on said one side thereof; wherein said plug member has a sealing portion, adjacent a free end portion thereof, for substantially plugging said liquid supply port by being inserted into the liquid supply port, and a liquid feeding portion, away from the free end portion, said liquid feeding portion having a cross-sectional area which is smaller than that of said sealing portion, wherein the cross-sectional area is in a plane parallel with the liquid supply port.

18 Claims, 13 Drawing Sheets

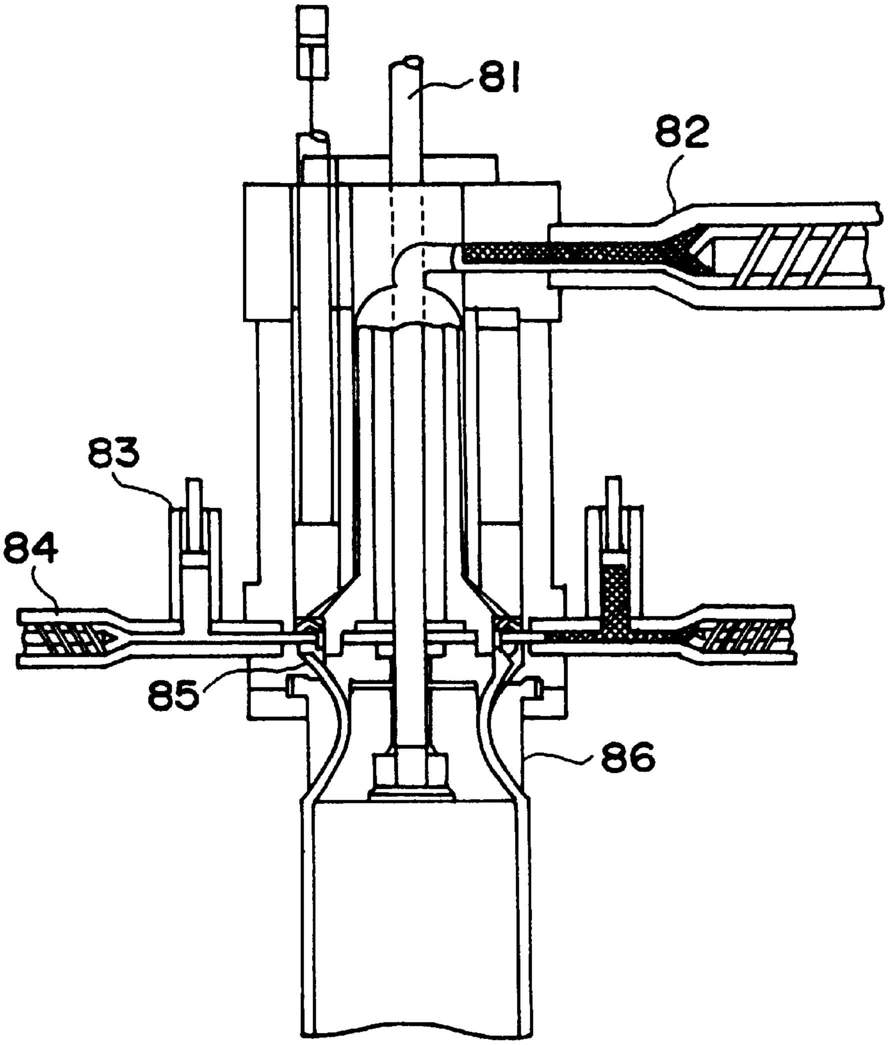
FIG. 9(a)
FIG. 9(c)
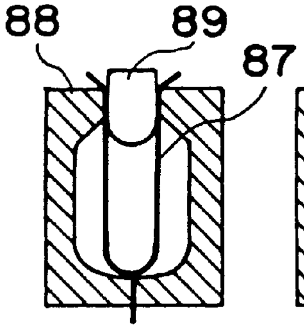
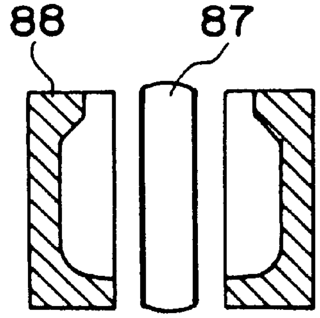
FIG. 9(b)
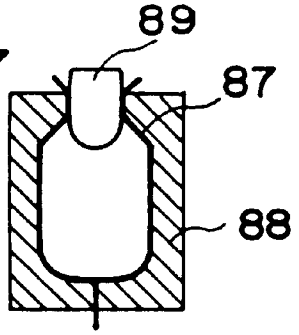
FIG. 9(d)

VALVE FOR RECORDING LIQUID SUPPLY PORT

FIELD OF THE INVENTION AND RELATED ART

The present invention relates to a valve member, a valve using it, an ink container using the same, and an ink jet cartridge usable with the same, in an ink jet recording apparatus for effecting recording by ejecting ink. Here, the ink is not limited to a liquid containing coloring material, but covers any liquid used for recording.

In many of an ink supply systems for an ink jet recording apparatus or the like, the recording means and the ink accommodating portion are separate, and they a separable from the recording device, wherein they are connected in use. This is advantageous in that path from the ink accommodating portion to the recording means is short, so that recording device can be downsized, and in that ink can be supplied by exchanging the ink accommodating portion only, and therefore, the running cost is low.

Referring first to FIG. 13, there are shown prior art valve structures. In FIG. 13*a*, an ink container 110 has an elastic sealing member 111 which is fixed at the edge of the ink supply port, and a plug 112 is urged from inside to the elastic sealing member 111 by a spring material 113. In FIG. 13(*b*) the gap between the plug 117 and the ink supply port, is removed to omit the elastic sealing member.

In this system, the structure for the disconnectably connecting the ink container and the recording head, is important, since the leakage prevention of the ink from the ink container before use thereof and the proper supply of the ink into the recording head, should be assured.

SUMMARY OF THE INVENTION

Accordingly, it is a principal object of the present invention, to provide a valve member, a valve using it, an ink container having it, and an ink jet cartridge using it, wherein the leakage of the ink from the container is effectively prevented.

It is another object of the present invention, to provide a valve member, a valve using it, an ink container having it, and an ink jet cartridge using it, wherein the ink can be supplied into a recording head in good order when the ink container is connected the recording head.

It is a principal object of the present invention, to provide a valve member, a valve using it, an ink container having it, and an ink jet cartridge using it, wherein the leakage of the ink from the container is effectively prevented, even if the connection and disconnection between the ink container and the recording head are repeated.

It is further object of the present invention, to provide a valve member, a valve using it, an ink container having it, and an ink jet cartridge using it, wherein the ink can be supplied into a recording head in good order when the ink container is connected the recording head, even if the connection and disconnection between the ink container and the recording head are repeated.

It is a further object of the present invention to provide a valve structure effectively usable with an ink container capable of producing negative pressure using elastic deformation of the ink container rather than foam material or the like.

According to an aspect of the present invention, there is provided a valve member for a recording liquid supply port connectable with a liquid ejection recording means for supplying recording liquid to said liquid ejecting means, comprising: an elastically deformable plate-like member; a plug member on one side of said plate-like member; a supporting member for supporting said plate-like portion on said liquid container, said supporting member being on said one side thereof; wherein said plug member has A sealing portion, adjacent a free end portion thereof, for substantially plugging said liquid supply port by being inserted into the liquid supply port, and a liquid feeding portion, away from the free end portion, said liquid feeding portion having a cross-sectional area which is smaller than that of said sealing portion, wherein the cross-sectional area is in a plane parallel with the liquid supply port. According to this, the prevention of the ink leakage is assured before it is connected with the recording head, and the ink supply thereto is assured when it is connected to the recording head.

According to another aspect of the present invention, there is provided a valve for a recording liquid supply port connectable with a liquid ejection recording means for supplying recording liquid to said liquid ejecting means, comprising: a valve seat having a connecting portion for connection with said liquid supply port and an opening capable of supplying liquid to said recording means; a valve for substantially plugging said opening of said valve seat; said valve member including: a plug member on one side of said plate-like member; a supporting member for supporting said plate-like portion on said liquid container, said supporting member being on said one side thereof; wherein said plug member has A sealing portion, adjacent a free end portion thereof, for substantially plugging said liquid supply port by being inserted into the liquid supply port, and a liquid feeding portion, away from the free end portion, said liquid feeding portion having a cross-sectional area which is smaller than that of said sealing portion, wherein the cross-sectional area is in a plane parallel with the liquid supply port. According to this, the prevention of the ink leakage is assured before it is connected with the recording head, and the ink supply thereto is assured when it is connected to the recording head.

When the ink container is connected with the recording means or head, so that supply tube of the recording means is inserted, the plate of the valve member is elastically deformed so that plug member moves into the ink accommodating portion, thus permitting the ink to be supplied to the recording means from the ink accommodating portion of the container. When the ink container is not connected with the supply tube, the plate member is not deformed. Since the diameter of the sealing portion of the valve plug member is very slightly smaller than the inner diameter of the opening of the valve seat, the valve member is held in the ink container by the meniscus of the ink in the ink accommodating portion.

According to a further aspect of the present invention, a press-contact member of fibrous member is used to cover the upper portion of the valve seat, so that neighborhood of the valve seat opening is substantially sealed. Thus, the evaporation of the ink when the container is not connected with the recording means can be suppressed, and the configuration of the supply tube and the insertion method thereof are less limited.

When the press-contact member is used, the ink leakage can be prevented, even if the inner diameter of the valve seat recess is larger than the outer diameter of the supply tube. When the depth of the recess of the valve seat is larger than the length of the supporting member, and is shorter than the length of the plug member, the press-contact member is not closely contacted to the valve member even when the ink container is not connected with the recording means. Even upon impact to the ink container, or abrupt change of the ambience, the press-contact member is effective to retain the valve member in the ink container.

According to a further aspect of the present invention, there is provided a liquid container connectable with a recording means, comprising: a liquid accommodating portion; a liquid supply port for supplying liquid to said recording means;

a valve in said liquid supply port; said valve including: a valve seat having a connecting portion for connection with said liquid supply port and an opening capable of supplying liquid to said recording means; a valve for substantially plugging said opening of said valve seat; said valve member including: a plug member on one side of said plate-like member; a supporting member for supporting said plate-like portion on said liquid container, said supporting member being on said one side thereof; wherein said plug member has A sealing portion, adjacent a free end portion thereof, for substantially plugging said liquid supply port by being inserted into the liquid supply port, and a liquid feeding portion, away from the free end portion, said liquid feeding portion having a cross-sectional area which is smaller than that of said sealing portion, wherein the cross-sectional area is in a plane parallel with the liquid supply port. According to this, the usable ink can be selected from wider range, and the container is not easily torn in a particular direction when force is applied thereto. According to a further aspect of the present invention, a coupling mechanism of the ink container with the means with which the ink container is used, is made of the same material as the ink accommodating portion. This permits easy reuse of the material.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 9(*a*), 9(*b*), 9(*c*) and 9(*d*) depict an ink container manufacturing process, illustrating a sequence of steps in the process.

DESCRIPTION OF PREFERRED EMBODIMENTS

Hereinafter, the details of the embodiments of the present invention will be described with reference to the drawings.

(First Embodiment)

Figure 1B:
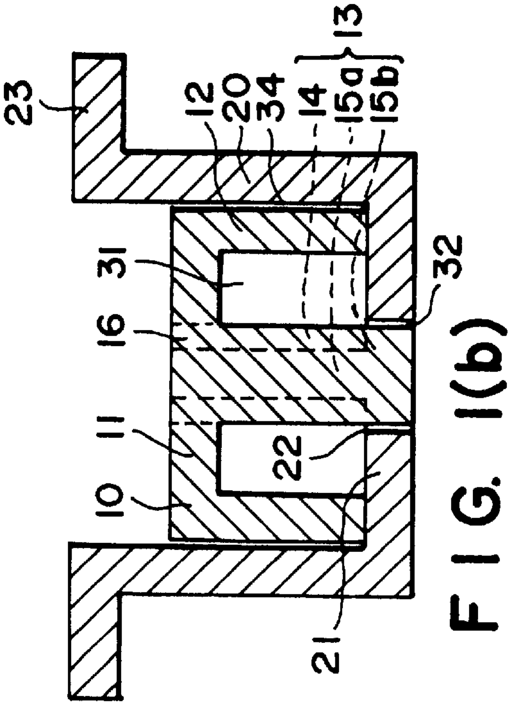
FIGS. 1(*a*), 1(*b*) and 1(*c*) schematic views of a valve for an ink container according to a first embodiment of the present invention, wherein FIG. 1(*a*) is an exploded perspective view, FIG. 1(*b*) is sectional view when a recording head is not coupled with the ink container, and FIG. 1(*c*) is a sectional view when the recording head is coupled with the ink container.
Figure 1C:
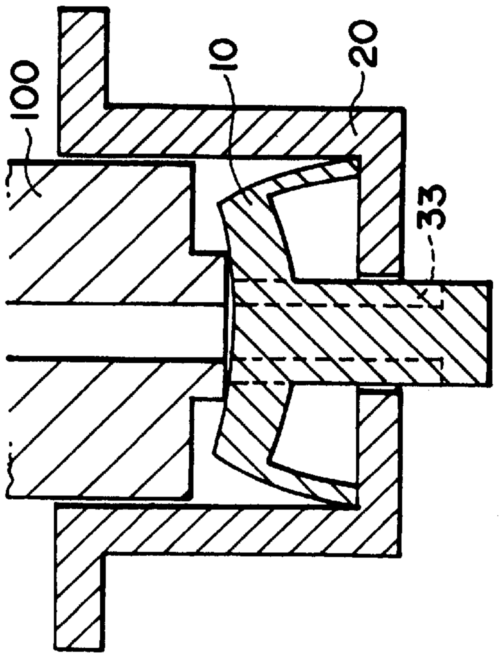
Figure 1A:
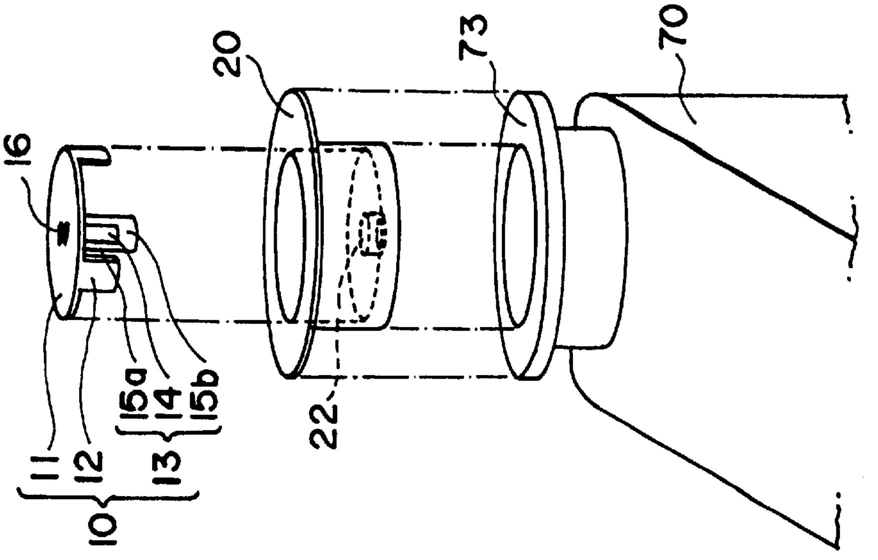

FIG. 1 is a schematic view of a valve for an ink container according to a first embodiment of the present invention, wherein (*a*) is an exploded perspective view, (*b*) is sectional view when a recording head is not coupled with the ink container, and (*c*) is a sectional view when the recording head is coupled with the ink container. As shown in FIG. 1, the valve of this embodiment comprises two parts, namely, a valve member 10 and a valve seat member or valve seat 20, and is mounted to an ink supply port 73 Valve member 10 comprises a plate-like member or portion 11, supporting member 12, and plug member 13, and is separable from the valve seat. The valve seat 20 is substantially concave in shape, and has a flange portion 23 which is a connecting portion relative to the ink supply port, and an opening 22 in the bottom surface.

The plate-like portion 11 of the valve member is a substantially flat plate, to which the supporting member 12 and the plug member 13 are mounted. The supporting member 12 is in the form of a column, and is contacted to the bottom surface 21 of the recess of the valve seat 20 to define a space between the plate-like portion 11 and the bottom surface 21 of the valve seat recess. The plug member 13 is in the form of a column and is extended in this embodiment perpendicularly to the plate-like portion 11. A communication groove 14 is formed extended from the portion 11 to a part of the plug member 13. The diameter of a sealing portion 15*b* is larger than the other portion (ink transportation portion) 15*a* of the plug member 13. The diameter of the sealing portion 15*b* of the plug member is slightly smaller than the inner diameter of the opening 22 of the valve seat 20 to provide a fine gap 32. On the other hand, the valve seat 20 is substantially concave in shape, and supports the valve member 10 by the supporting member 12 of the valve member abutting the bottom surface of the opening 22, and the valve member 10 is in valve seat. The flange portion 23 of the valve seat is wedded to the supply port portion of the unshown ink container, and the connecting direction thereof is such that opening of the valve seat 20 is between the ink container and the valve member 10.

The operation of the valve of the present invention will be described.

When the ink container is not connected with the recording means such as a recording head, a meniscus is formed by the ink in the fine gap 32 between the sealing portion 15*b* of the plug member of the valve member and opening 22 of the valve seat, as shown FIG. 1(*b*), and therefore, the valve member 10 is not disengaged from the valve seat 20, irrespective of the ink amount in the ink accommodating portion or the orientation of the container.

To prevent disengagement of the valve member 10 from the valve seat 20, the weight of the valve member 10 is properly supported by the meniscus of the ink in the fine gap. In this embodiment, the valve portion is integrally molded from polyethylene resin material, and the weight thereof is approx. 30 mg, and the fine gap 32 is provided by adjusting the dimensional tolerance for the fitting of the sealing portion 15*b* of the plug member in the opening 22 of the valve seat, and it has a diameter of 20 mm, and the gap is 10–40 microns in this embodiment.

On the other hand, when the recording means such as the recording head is connected to the ink container, the plate-like portion 11 is urged by the supply tube 100 of recording g means, as shown FIG. 1(*c*). The plate-like portion 11 is supported by the supporting member 12, and therefore, it is deflected while being confined by the supporting member 12. As a result, the sealing portion 15*b* of the plug member of the valve member is pushed through the opening 22 of the valve seat into the ink container. The diameter of plug member 13 is largest at the sealing portion 15*b*, and therefore, the gap 33 formed now between the opening 22 of the valve seat and the plug member 13 of the valve member is quite large as compared with the fine gap 32 shown in FIG. 1, (*b*). Therefore, when a suction force is produced in the recording means by ejection of the ink from the recording head, the ink is supplied to the recording head from the ink container through the gap 33 as a flow path.

In this embodiment, the valve member 10 per se elastically deforms as one of the features of the invention. The deflection direction of the elastic deflection of the plate-like member 11 is toward the inside (when the valve member 10 is mounted to the valve seat 20), and the plug member is mounted in this direction.

At the time of the coupling between the ink container and the recording means, the valve plug member 13 is inserted into the ink accommodating portion side of the ink container through the opening 22 of the valve seat. Therefore, in the case that ink accommodating portion is formed by a flexible bladder wherein the ink accommodating portion contracts in accordance with ink consumption, the inserted structure is effective to prevent plugging of the flow path due to the sticking of the flexible bladder material constituting the accommodating portion to the valve member 10 and/or the valve seat 20. In the case that absorbing material is used adjacent to the ink supply port of the ink accommodating portion, the insertion structure is effective to compress the absorbing material adjacent the supply port to increase the capillary force, thus improving the ink flow adjacent the ink supply port.

In this embodiment, the ink supply tube 100 has such a diameter relative to the opening into which the tube 100 is inserted that ink is not leaked between them.

The description will be made as to structures used in this embodiment.

In this embodiment, the recess of the valve seat 20 is substantially cylindrical, and the plate-like member 11 of the valve member is in the form of a disk having a diameter slightly smaller than the diameter of the cylindrical shape of the valve seat recess and is provided with a leg(supporting member 12) at each of three equidistant circumferential portions of the disk. The plug member 13 is provided with a communication groove 14 except for the sealing portion 15*b*, and the communication groove 14 is in fluid communication with a communication port 16 of the plate-like portion 11.

The plate-like portion 11 is preferably thinner (if the size is the same) or is preferably large (if the thickness is the same) when the same force is applied thereto upon connection with the recording means, from the standpoint of large displacement or deflection thereof. However, the plate-like portion is also required to assuredly hold the plug member without deformation when it is not connected or coupled with the recording means; and since the valve member is provided in the valve seat member, the size of the plate-like member is limited. The gap 34 between the plate-like portion 11 and the valve seat 20 is to be large enough not to prevent the deformation of the plate-like portion 11 at the time of coupling with the recording head.

In this embodiment, in view of these factors, the plate-like member 11 has a thickness of 0.2 mm, and the gap 34 is 10–140 microns. With these dimensions, the elastic deformation of the plate-like member 11 is properly permitted upon the coupling, and the plug member could be stably supported when it is not coupled with the recording means.

With such a small gap 34 between the member 11 and the valve seat 20, the disengagement of the valve member 10 from the valve seat 20 is further prevented even upon abrupt ambience change such as dropping. The space formed between the plate-like portion 11 and the bottom surface 21 of the valve seat recess, is not hermetically sealed. However, it is closed to a substantial extent, and therefore, the humidity in the space is higher than the ambience, so that evaporation of the ink in the ink container is suppressed as compared with the case where the opening of the valve seat is exposed directly to the ambience.

In this embodiment, the member 11 is provided with a communication port 16 having a diameter of approx. 2 mm. Therefore, when the container is coupled with the recording head, the ink is assuredly supplied to the recording head through the communication port 16. On the other hand, even if the communication port 16 is not provided, the gap between the valve seat 20 and the plate-like portion 11 is comparable to the communication port 16 because of the deflection of the plate-like portion 11 at the time of connection with the recording head, and the gap is usable as the ink flow path. For this reason, the provision of the communication port is inevitable.

In this embodiment, however, the valve member 10 is integrally molded from a polypropylene resin material. In this case, the following is possible. The plug member 13 is molded as a simple solid columnar member, and the plate-like portion 11 is molded as a disk, and boring process is effected to form a groove extending from the plate-like portion 11 to a part of the plug member 13, by which the communication port 16 and the communication groove 14 can be formed through one step. In this case, the configuration of the metal mold for producing the valve member 10 is very simple, and the metal mold manufacturing and the molding operation are easy.

In this embodiment, the supporting member 12 is provided with the legs, but this is not inevitable, if supporting member 12 has a free end there. However, in the case that peripheral portion of the valve member directly functions as the valve supporting member, there is a liability that degree of deformation of the plate-like portion is so large that plate-like portion bites into the valve seat member and therefore does not restore when the container is removed from the recording means. Therefore, the provision of the legs is preferable.

The legs may be provided at two portions at the periphery, and it is not inevitable to provided at the outermost peripheral. However, if the leg covers substantially the whole periphery, the degree of the deflection is liable to be too small, with the result of unstable support for the valve member 10. The member 11 may be inclined, and proper valve function may not be expected. In the case that supporting member 12 is provided not at the periphery, the degree of deflection of the member 11 may be too small if the force applied thereto is the same In consideration of the foregoing, three point support at the peripheral portion is desirable from the standpoint of the degree of deflection, restoration of the shape and stability of the plate-like member or portion 11. The support is further stabilized if the positions of the three points are determined such that angle formed between the plate-like portion and a line connecting a gravity center position of the member 11 and the gravity center position of a triangle formed by connecting the three points, is substantially 90 degrees. This is easily accomplished by providing the legs at three equidistant circumferential positions when the plate-like portion 11 has a simple disk shape. The thickness of the leg in this embodiment is 0.5 m m with the inner diameter of the valve seat 20 being 9.8 mm, and the tolerable range of the thickness is 0.1–1 mm.

(Second Embodiment)

Figure 2B:
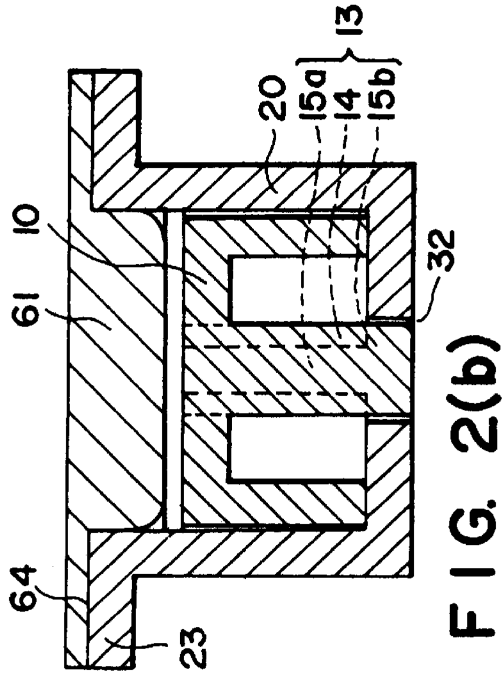
FIGS. 2(*a*), 2(*b*) and 2(*c*) are schematic views of a valve for an ink container according to a second embodiment of the present invention, wherein FIG. 2(*a*) is an exploded perspective view, FIG. 2(*b*) is sectional view when a recording head is not coupled with the ink container, and FIG. 2(*c*) is a sectional view when the recording head is coupled with the ink container.
Figure 2C:
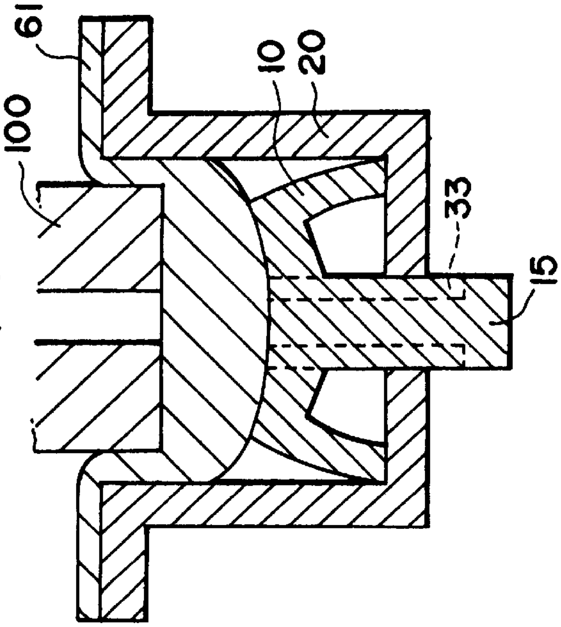
Figure 2A:
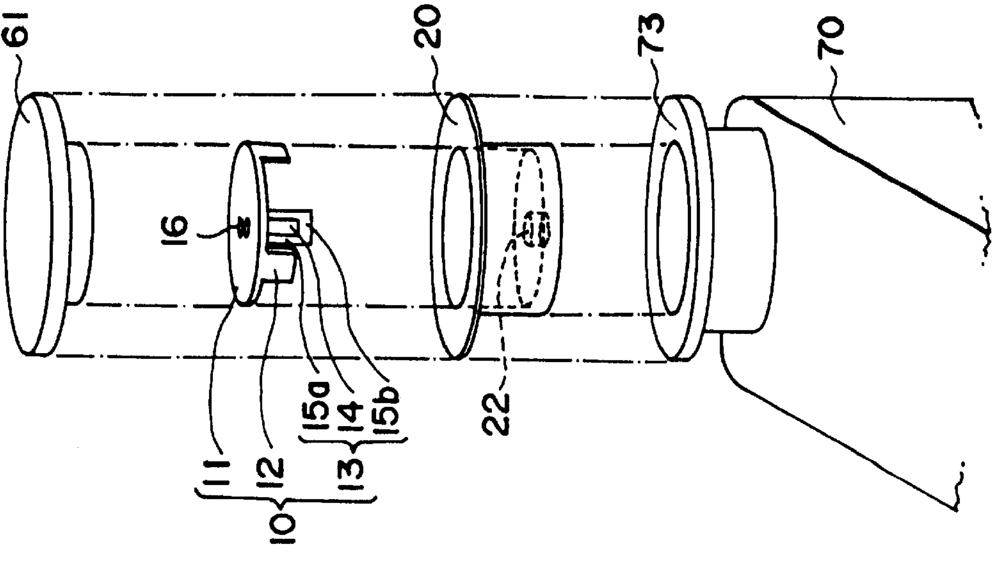

FIG. 2 is a schematic view of a valve for an ink container according to a second embodiment of the present invention, wherein (*a*) is an exploded perspective view, (*b*) is sectional view when a recording head is not coupled with the ink container, and (*c*) is a sectional view when the recording head is coupled with the ink container.

Figure 3A:
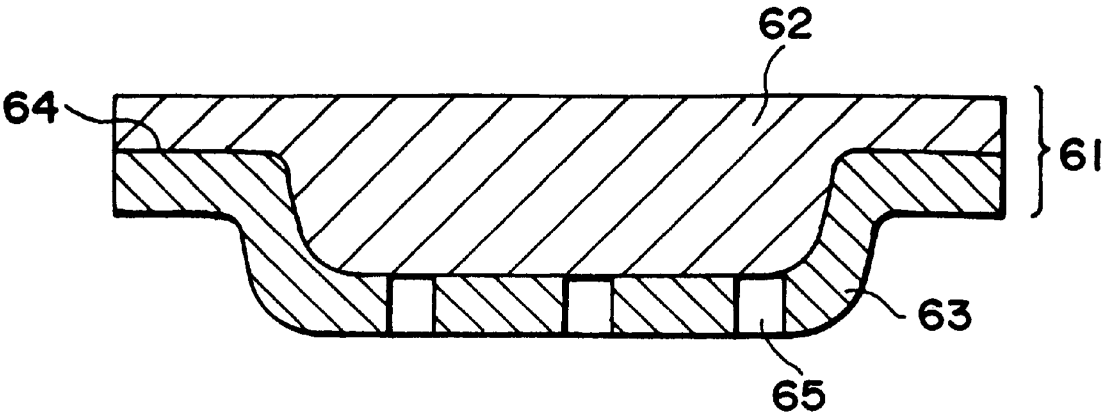
FIGS. 3(*a*) and 3(*b*) are schematic views of a press-contact member used in a coupling mechanism according to an embodiment of the present invention.
Figure 3B:
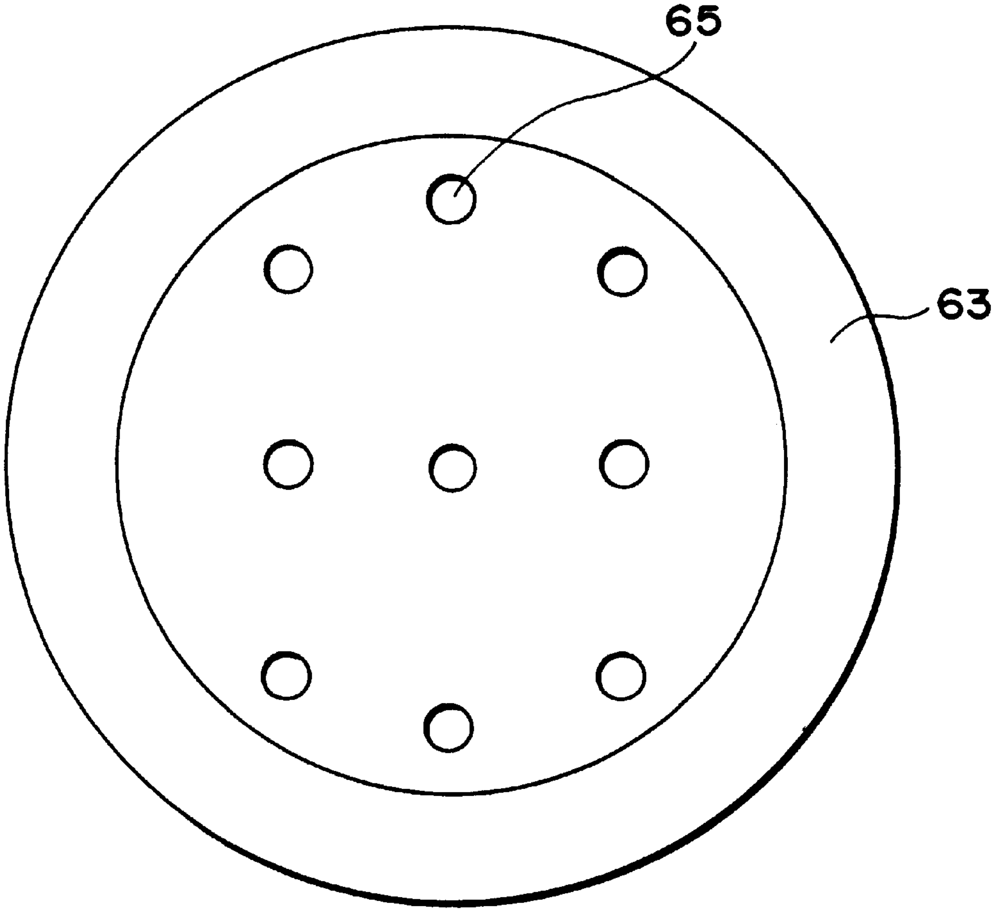

FIG. 3 is a schematic view of the press-contact member 61.

As shown in FIG. 1(*b*), a coupling mechanism comprises the valve constituted by the valve member 10 and the valve seat 20, and the press-contact member 61. Here, the valve per se is the same as with FIG. 1(*b*). The press-contact member 61, as shown in FIG. 3, comprises a nonwoven fabric 62 having a low fiber density and a nonwoven fabric 63 having a high fiber density. The two nonwoven fabric materials are welding together at the position of the flange portion (nonwoven fabric welded portion) 64, and therefore, the press-contact member 61 is made integral with the valve by welding the flange portion 64 of the press-contact member with the flange portion 23 of the valve seat with the high fiber density nonwoven fabric being at the inside. The nonwoven fabric B63 having the fiber density is provided adjacent the center thereof with a plurality of communication holes 65 to assure the ink supply.

Figure 7A:
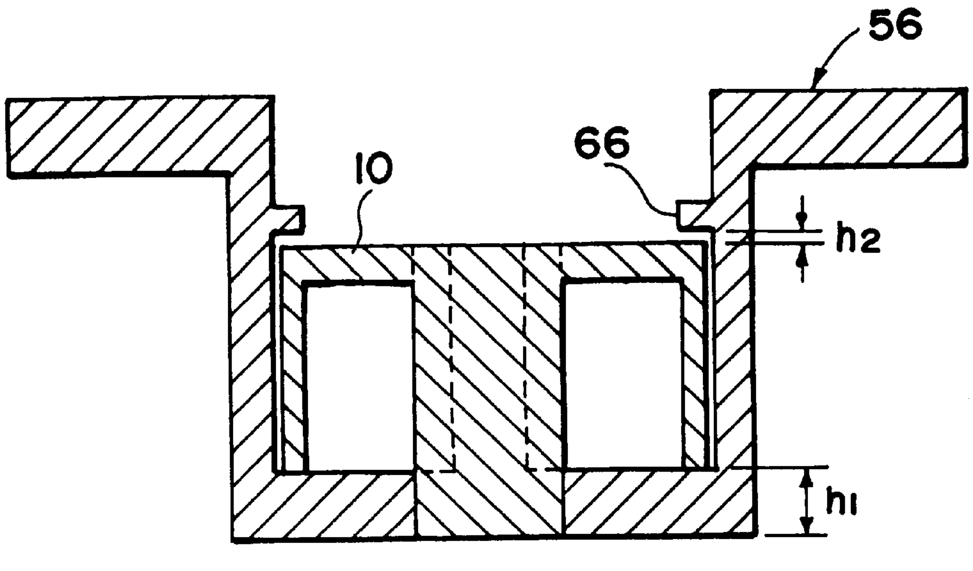
FIGS. 7(*a*) and 7(*b*) are a schematic views showing modified examples of a valve according to an embodiment of the present invention, wherein FIG. 7(*a*) is a sectional view, and FIG. 7(*b*) is an exploded perspective view.
Figure 7B:
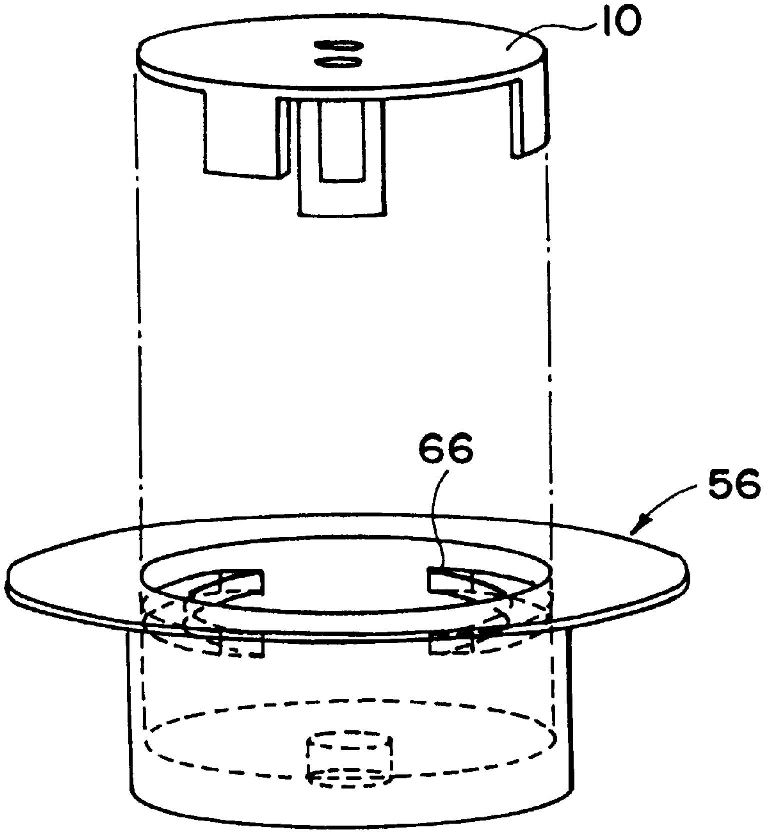

In this embodiment, the nonwoven fabric A of the press-contact member 61 is of polypropylene nonwoven fabric, and the nonwoven fabric B thereof is of polyethylene-polypropylene mixed nonwoven fabric, which are ultrasonic welded, and during the ultrasonic welding, an ultrasonic molding is simultaneously effected to provide the form shown in FIG. 7. The materials of the valve member 10 and the valve seat 20 is polyethylene resin material, the same as with the first embodiment.

According to this embodiment, the evaporation speed of the ink is further reduced by the provision of the press-contact member 61. The prevention of the disengagement of the valve member 10 from the valve seat 20 is further assured, and the limitation imposed to the configuration of the usable ink supply tube 100 is further reduced. This will be described in more detail.

Referring to FIG. 2, the description will be made as to the evaporation speed and the disengage prevention.

As described in the foregoing, the flange portion 64 of the press-contact member is welded on the flange portion 23 of the valve seat. By welding the press-contact member 61 with the valve seat 20, the hermeticality at the opening of the ink container is improved, thus further suppressing the ink leakage.

In this embodiment, the press-contact member 61 and the valve seat 20 are welded together by the ultrasonic welding, and therefore, the hermeticality at the opening is higher than in the case of using an ordinary welding. Since the valve seat is covered by the press-contact member, the ink evaporation from the neighborhood of the opening of the valve seat, is smaller. The valve member 10 and the press-contact member 61 are so arranged that they are not contacted when the container is coupled with the recording means, and therefore, the leakage of the ink due to the capillary force is prevented.

The flange portion 64 of the press-contact member is solidified at the time of ultrasonic welding, and therefore, the ink cannot pass therethrough. The ink is permitted to pass only at the central portion thereof, thus preventing the ink leakage at the press-contact member welded portion (circumference portion).

Under abnormal conditions, such as when an external impact is imparted to the container (when it is let fall), or when the ambient air is introduced into the ink accommodating portion of the ink container and is expanded due to an abrupt temperature change, the valve member 10 may be disengaged, if the press-contact member is not provided, with the result the ink is leaked out. However, in this embodiment, the press-contact member 61 is provided to close the recess of the valve seat 20 without contact to the valve member 10, so that movement of the valve member 10 in the direction opposite from the mounting direction is limited. Therefore, even under the abnormal conditions, the valve member 10 is not disengaged. Since the press-contact member 61 is of nonwoven fabric materials, the ink leaked out is absorbed to prevent scattering of the ink.

The description will be made as to the supply tube of the recording means to be connected to the connecting portion of the ink container having the valve in this embodiment .

The ink container and the recording means are to be connected so that ink is not leaked, and therefore, the ink supply tube 100 is required to have a complicated configuration in many cases. However, with the coupling structure of this embodiment, the gap between the valve seat 20 and the supply tube 100 is removed by the press-contact member 61 at the connecting portion if the diameter of the ink supply tube 100 is smaller than that of the recess of the valve seat 20. Thus, stabilized ink supply is accomplished without leakage. The central portion of the press-contact member 61 is pressed by the supply tube 100, and therefore the material there is compressed, so that capillary force there becomes larger than the other portion. Therefore, by the press-contact member 61 pressed to the ink supply tube 100, it is brought into contact to the valve member 10 to deform the valve member 10 so as to form the ink flow path. By this, the ink is supplied to the recording means from the ink supply tube 100.

The force is applied to the valve member 10 through the press-contact member 61 wherever the ink supply tube 100 of the recording means presses. Therefore, the force is efficiently applied to the valve member 10 so that valve member 10 can assuredly insert the plug member 13 into the ink accommodating portion.

The press-contact member 61 may be of one material, which can be desirably ultrasonic welded. In this embodiment, however, the press-contact member 61 is of two different nonwoven fabric materials which have respective functions. Since the nonwoven fabric B having a higher fiber density is disposed inside, the configuration of the press-contact member 61 can be made proper for the welding to the valve seat 20 to assure the welding thereof to the valve seat 20. Since the nonwoven fabric A having the low fiber density is disposed outside, the ink leakage prevention is assured. The nonwoven fabric B having the higher fiber density is of a mixed nonwoven fabric material of polyethylene and polypropylene materials, and the nonwoven fabric having a low fiber density is of polypropylene nonwoven fabric material, and the valve seat 20 is of polyethylene resin material. Therefore, the ultrasonic welding is possible between the nonwoven fabric materials and between the valve seat 20 and the nonwoven fabric B having the higher fiber density.

(Other Embodiments)

Other embodiments will be described.

<Modified examples of the valve>

FIGS. 4–7 show modified examples of the valve of the present invention.

Figure 4A:
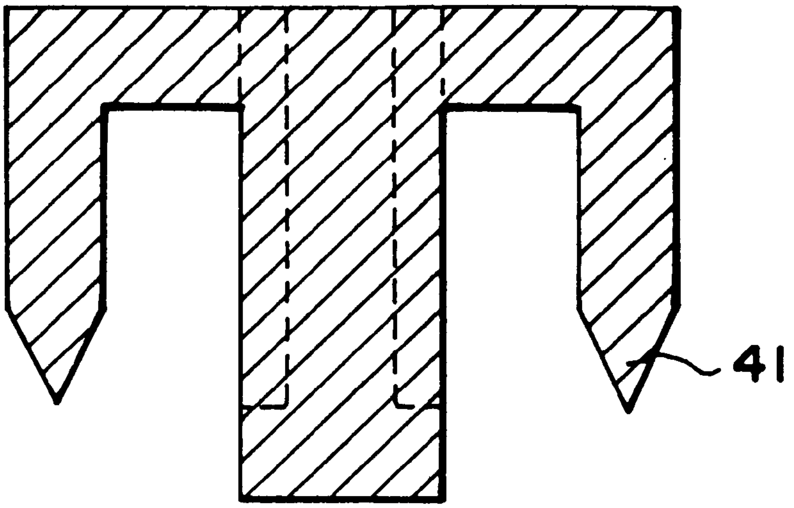
FIGS. 4(*a*) and 4(*b*) are schematic sectional views showing modified examples of a leg provided at a valve member circumferential portion of the valve according to an embodiment of the present invention.
Figure 4B:
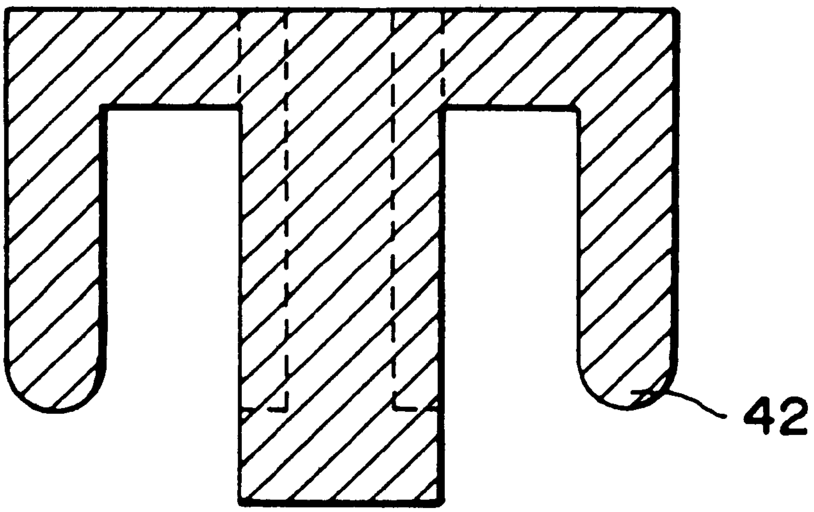
Figure 5A:
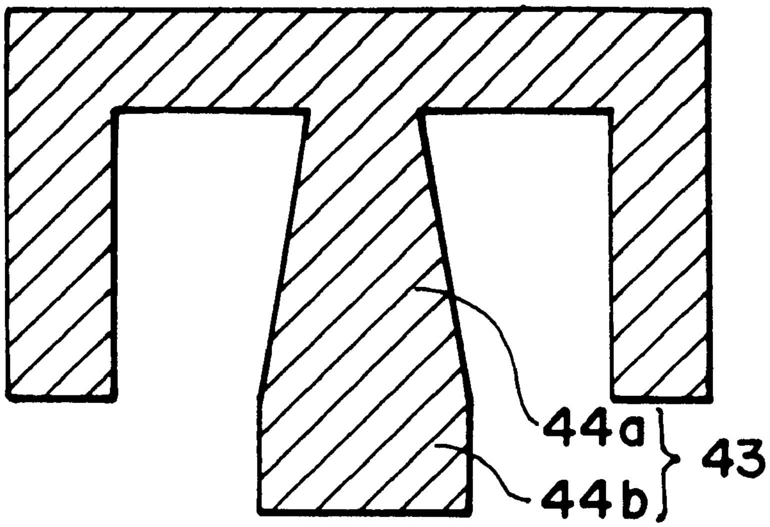
FIGS. 5(*a*) and 5(*b*) are is a schematic sectional views showing a modified example of a valve member projection of a valve according to an embodiment of the present invention.
Figure 5B:
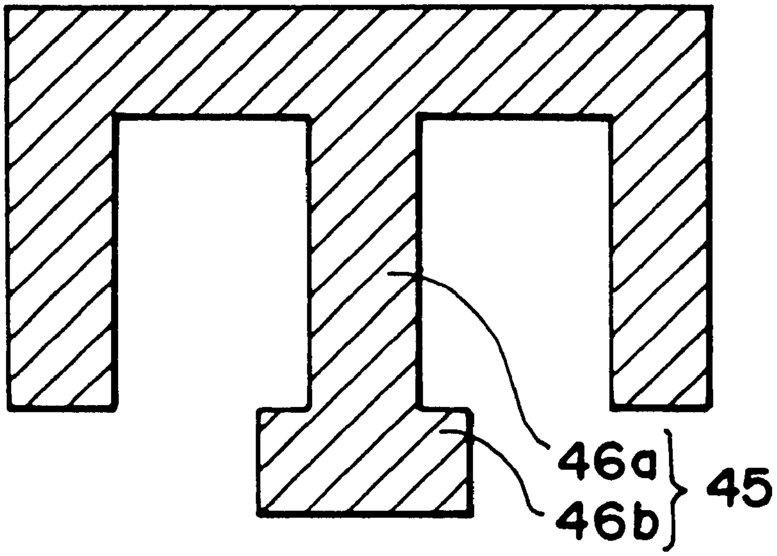

FIG. 4 is schematic sectional views showing modified examples of a leg provided at a valve member circumferential portion of the valve according to an embodiment of the present invention. In the foregoing embodiments, the leg has a flat free end portions. In FIGS. 4, (*a*), and (*b*), the end portion has a sharp shape, or rounded shape. FIG. 5 is a schematic sectional view showing a modified example of a valve member projection of a valve according to an embodiment of the present invention. The plug member 43 shown in FIG. 5, (*a*), a cross-sectional area thereof taken along a plane parallel with a ceiling member of an ink transportation portion 44*a*, decreases toward the fixed end. In FIG. 5, (*b*), the diameter is smaller away from the free end 46*b*, in place of the provision of the groove for the ink transportation portion 46*a*. In any cases, the cross-sectional area taken along the plane parallel with the ink supply port is made smaller than that at the sealing portion, so that space or gap between the opening of the bottom surface and the plug member is larger under the coupled state than under the non-coupled state. By this, the space functions as an ink flow path when the ink is ejected from the recording head to permit stabilized ink supply to the recording head.

Figure 6A:
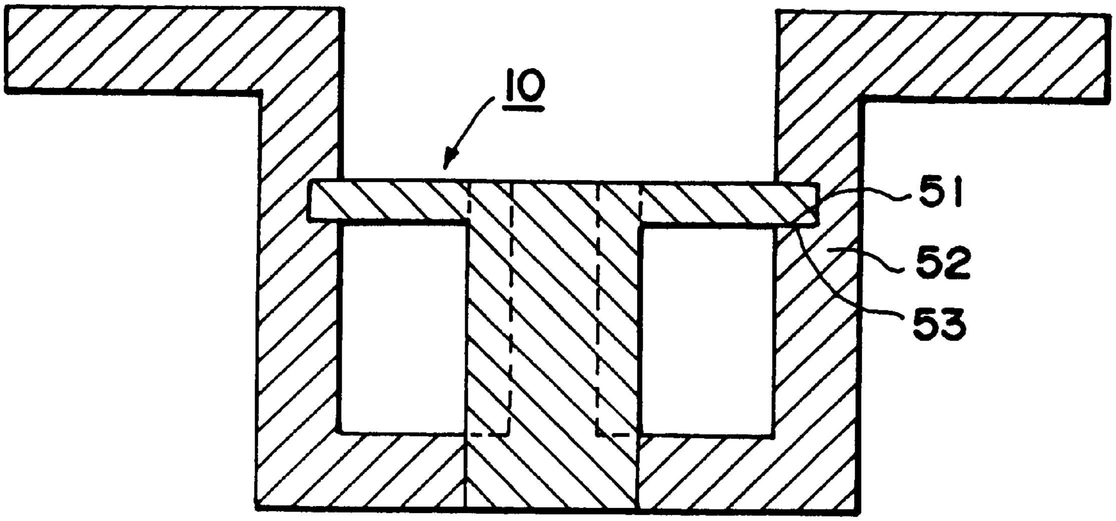
FIGS. 6(*a*) and 6(*b*) are schematic sectional views showing modified examples of valve seat and a valve member in a valve according to an embodiment of the present invention.
Figure 6B:
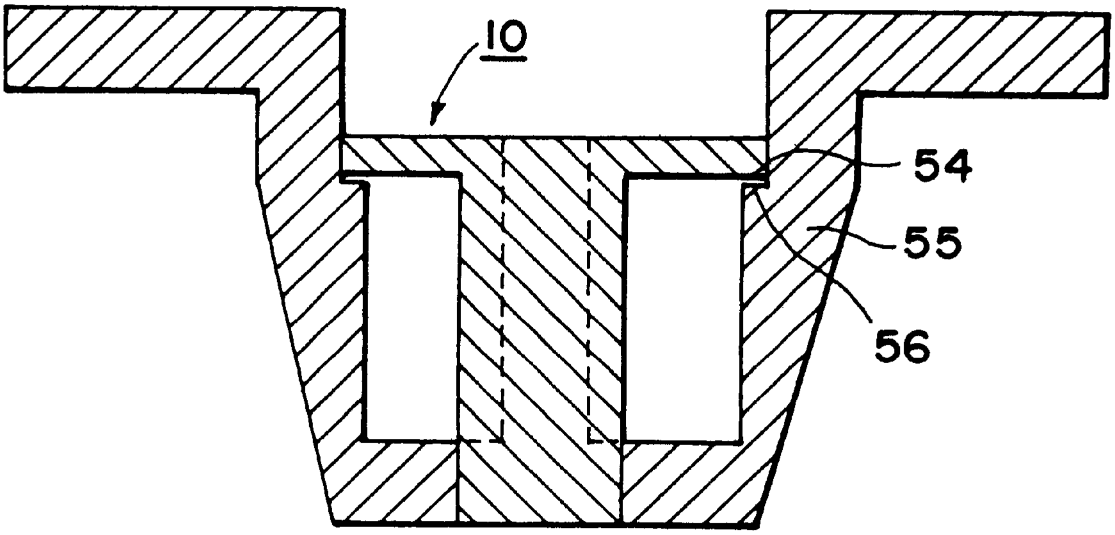

FIGS. 6, (*a*) and (*b*) are schematic sectional views showing modified examples of valve seat and a valve member in a valve according to an embodiment of the present invention. In the foregoing embodiment, the supporting member for the valve member is provided with a leg, but it may be replaced with any free end. In the modified example of FIG. 6, the peripheral portions 51, 54 of the valve member are the valve supporting portion. The valve seat 52 or 55 is provided with members 53, 56 for supporting the peripheral portion of the valve member.

Other embodiments wherein the valve member is retained even upon the impact applied thereto, will be described. FIGS. 7, (*a*) and (*b*) are a schematic views showing modified example;s of a valve according to an embodiment of the present invention, wherein (*a*) is a sectional view, and (*b*) is an exploded perspective view. In FIG. 7, (*a*), the valve seat 56 is provided with ribs 66 at such a position that gap h2 is formed in the uncouples state. The gap h2 is made smaller than the thickness h1 of the sealing portion of the valve member, so that valve member is prevented form disengagement even upon the abrupt external ambience change.

In the foregoing embodiment, the case has been dealt with wherein the ink supply port of the ink container is a simple opening, and the valve is constituted by the valve member and the valve seat. If, however, the ink supply port has the same configuration as the valve seat described above, what is additionally needed is the valve member.

<Ink container>

Figure 8A:
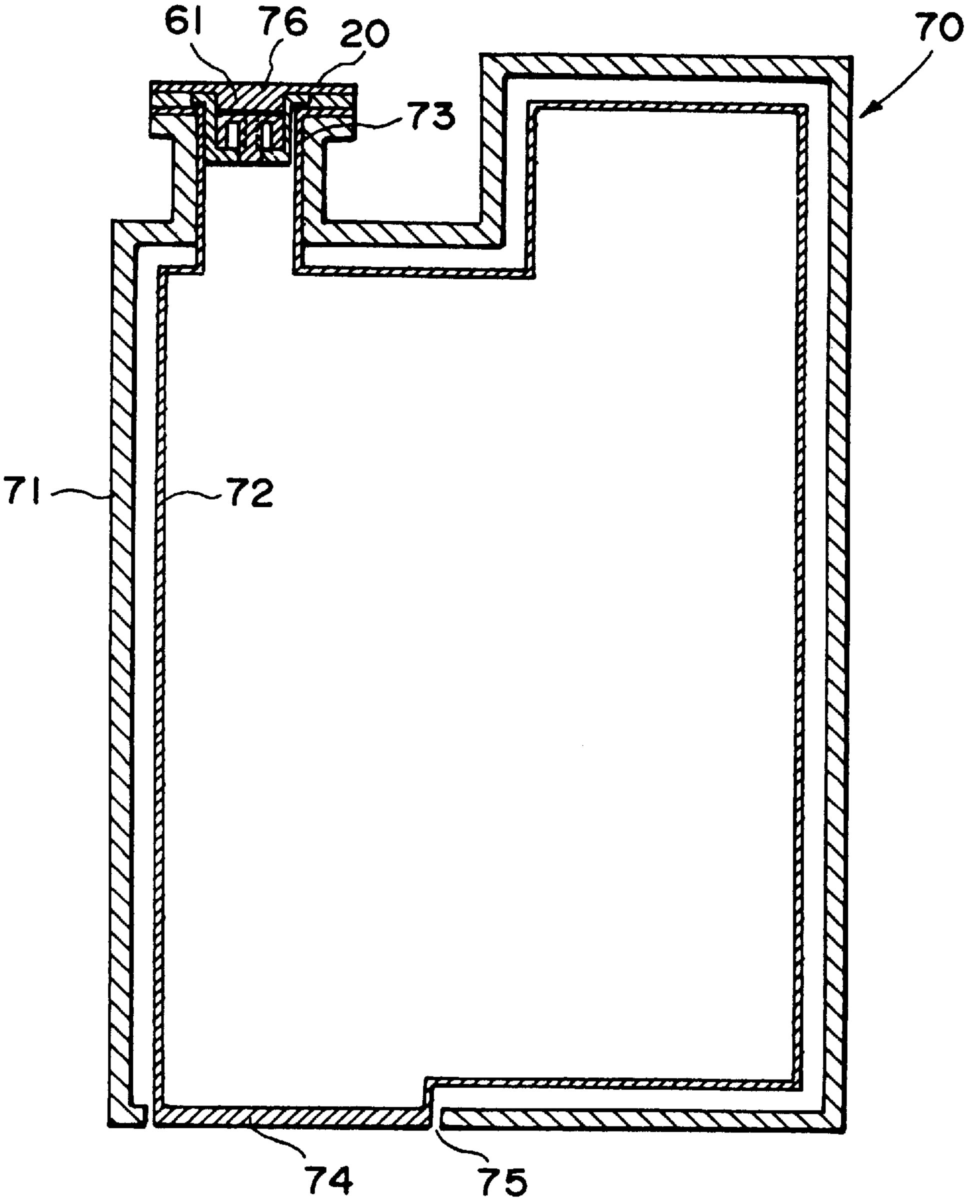
FIGS. 8(*a*) and 8(*b*) are schematic sectional views of an ink container according to an embodiment of the present invention, wherein FIG. 8(*a*) is a sectional view, and FIG. 8(*b*) is a bottom view.
Figure 8B:
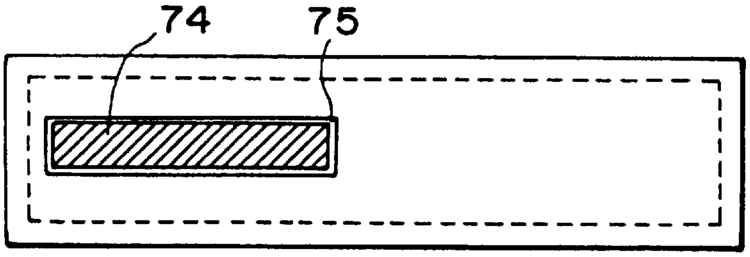

Referring to FIG. 8, an embodiment of the ink container having the valve of the present invention, will be described.

FIG. 8 is a schematic sectional view of an ink container according to an embodiment of the present invention, wherein (*a*) is a sectional view, and (*b*) is a bottom view. In this embodiment, the inner wall and an outer wall of the ink container are simultaneously molded through one step, by blow molding.

The ink container 70 shown in FIG. 8, comprises the outer wall, the inner wall, a close contact portion, an air vent, and the valve. The ink is filled in an ink accommodating portion defined by the inner wall(initial state).

When the ink is ejected from an unshown recording head to which the ink container 70 is connected, the ink is fed out of the ink accommodating portion to the recording head. At this time, a negative pressure is produced and is effective to deform the inner wall 72. The inner wall 72 however has such an elasticity as to provide a back pressure(negative pressure) with the ink to be supplied to the recording means and to keep the negative pressure.

The outer wall functions to protect the ink accommodating portion to prevent the leakage of the ink to the outside upon the unintentional deformation of the inner wall containing the ink.

In this embodiment, the material of the outer wall is high impact polystyrene resin material, and the resin material of the inner wall is polyethylene resin material having a low elastic modulus than the high impact polystyrene resin material.

Between the outer wall 71 of the ink container and the inner wall 72 thereof, there is provided a space which is filled with the air. The space is small in the initial state, and the corner portions of the inner wall 72 are at the positions corresponding to the corner portions of the outer wall 71, and the inner wall as a whole is generally along the configuration of the outer wall 71.

Therefore, in the initial state, the inner wall has a shape substantially similar to the outer wall 71, so that inner wall is contained in the outer wall 71 functioning as a casing with gaps therebetween in a predetermined range. Thus, a dead space in a conventional container comprising a casing and a bladder-like container therein can be substantially removed, thus increasing the ink accommodation capacity per unit volume of the outer wall of the ink container(ink accommodation efficiency is increased).

Designated by 73 is an ink supply port and is a connecting portion with the recording means, and has the structure of the valve 76 of the present invention described in the foregoing. The valve seat 20 is of the same material as the inner wall of the ink container, and the valve seat 20 and the ink accommodating portion are assuredly connected together by ultrasonic welding. The inner wall and the outer wall are connected at this position.

By mounting the valve 76 of the present invention to the ink supply port 73, the ink retention function of the ink container can be further strengthened, so that ink leakage upon abrupt change of the ambience and the ink evaporation are prevented. By using a valve of the present invention, any ink supply tube 100 of the recording means is usable if the diameter thereof is smaller than that of the valve seat 20, thus improving the latitude in the design of the supply tube 100.

Furthermore, by the ultrasonic welding of the valve seat 20 member to the ink supply port, the hermeticality of the ink container is increased, so that connection between the ink supply port and the recording means is improved, and in addition, the configuration of the inner wall adjacent the supply port is maintained to improve the configuration stability, as well. In addition, at the time of deformation of the inner wall resulting from consumption of the ink, the inner wall can stably deform with the valve seat 20 functioning as one of supporting members. Since the plug member 13 of the valve member is inserted into the ink accommodating portion as described hereinbefore, there is no liability that ink flow path is shut off by the inner wall deforming and plugging the inside of the ink supply port. Thus, the ink supply can be stabilized.

Therefore, when the ink container inside-volume is reduced as a result of the consumption of the ink from the ink accommodating portion from the initial state, the ink accommodating portion 72 is supported by the ink supply port portion 73 and the supporting portion 74. By this, irregular deformation of the inner wall 72 is prevented to accomplish stabilized negative pressure production.

In this embodiment, the molding is effected by a direct blow molding method, and therefore, it is easy to provide a plurality of supporting portions for the inner wall at the supporting portion 74 and the ink supply port portion 73. However, it not inevitable to provide a plurality of supporting portions for the inner wall. If irregular deformation of the inner wall at the time of the ink consumption, is limited, the supporting portion 74 may be omitted, and it may be supported at the ink supply port portion 73.

Designated by 75 is an air vent for introducing the air into the space between the outer wall 71 and the inner wall 72 when the volume of the inner wall 72 is reduced in accordance with the consumption of the ink therein.

At this time, a small gap is formed in the outer wall by the separation, and the gap is used as an air vent 75.

In this case, the inner wall 72 is separated from the outer wall 71, and the gap provided by the separation is as small as several microns to several tens microns approx., and therefore, the inner wall 72 is still supported by the outer wall 71.

As for an example of the method for forming the gap, the inner wall is separated from the outer wall as has been described hereinbefore using residual stress or the like occurring as a result of use of different materials for the outer wall and the inner wall. Here, the during the blow molding, the ambience inlet or air vent is simultaneously formed in the process of separating the outer wall from the inner wall. The use of the gap at the close contact portion 74 provided by applying external force as in this embodiment, is not inevitable, but a hole may be formed in the outer wall 71 of the ink container.

In this embodiment, a blow molding using blowing air is used for a manufacturing method of the ink container having the coupling mechanism described in the foregoing. This is because the wall constituting the ink container is made of resin material not having an orientation property (substantially not expanded). By this, it is not easily torn in a particular direction, and the inner wall constituting the ink accommodating portion is durable against load uniformly in any direction. Even when the ink accommodated in the inner wall after a certain degree of the ink is consumed, is swung, the inner wall can assuredly retain the ink, thus improving the overall durability of the container. The direct blow molding method will be described in detail. FIG. 9 is an explanatory drawing depicting an ink container manufacturing process, (*a*), (*b*), (*c*) and (*d*) sequentially illustrating various steps.

In FIG. 9, designated by 81 is a main accumulator for supplying resin material for the inner wall; 82 is a main extruder for extruding resin material for the inner wall; 83 is a sub-accumulator for supplying resin material for the outer wall; and 84 is a sub-extruder for extruding resin material for the outer wall. The resin materials for the inner wall and the outer wall supplied by them, are supplied to a die 86 by which an integral parison 87 is formed. The parison 87, as shown in FIGS. 9, (*b*) to (*d*), is molded by a metal mold 88 sandwiching the parison 87 and using the air nozzle 89.

Figure 10:
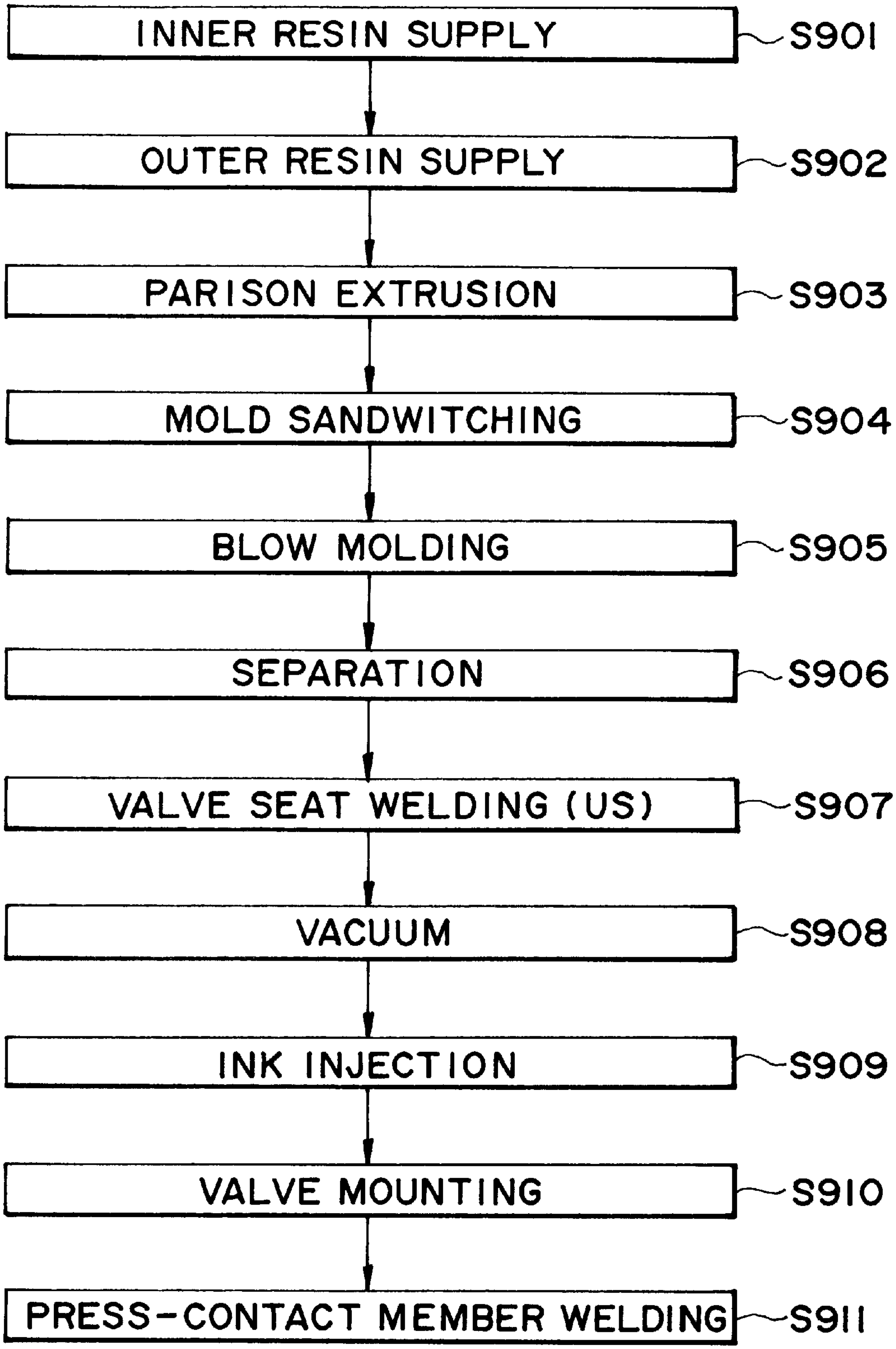
FIG. 10 is a flow chart showing ink container manufacturing steps according to an embodiment of the present invention.

Referring to FIGS. 9 and 10, the ink container manufacturing process will be described.

The inner resin material and the outside resin material are supplied (steps S901 and S902) to extrude the parison 87 (step S9 03)). A metal mold 88 is moved from the position of FIG. 9, (*b*), to the position (*c*) to sandwich the parison 87 (step S9 04). Subsequently, as shown in FIG. 10, (*c*), the air is injected, and the blow molding is carried out to the shape of the mold 88 (step S9 05).

Thereafter, the inner wall and the outer wall are separated from each other by using materials having different heat contraction rates for the inner wall and the outer wall or by applying external force after cooling, or the like. At this time, the air vent is formed simultaneously.

Then, the valve seat 20 is ultrasonic welded (step S907), and the vacuum suction is carried out (step S908). Then, the ink is injected (step S909), and the valve member 10 is mounted. Subsequently, the press-contact member 61 is ultrasonic welded (step S911). When the ink is injected into the ink container, the ink accommodating portion is suctioned by vacuum, and then the amount of the ink which is approx. 90%–95% of the initial state volume of the inner wall is injected In this manner, the separation between the inner wall and the outer wall is complete, and the ink container is durable against ambience change. Namely, this will further prevent the leakage of the ink due to the external force, temperature change and/or change of the pressure. Furthermore, the proper negative static pressure can be provided at the initial stage of the use of ink container.

In the blow molding, the parison 87 is processed while it as a substantial viscosity, and the therefore, neither of the inner wall resin material and the outer wall resin material has an orientation property. The employment of blow molding can reduce the number of manufacturing steps and the number of the components, which in turn can improve yield, and also allows the inner wall 102 to be formed in such a manner that edges and corners of the inner wall 102 are set in those of the outer wall 101 in a orderly manner.

<Liquid ejection head cartridge>

Figure 11A:
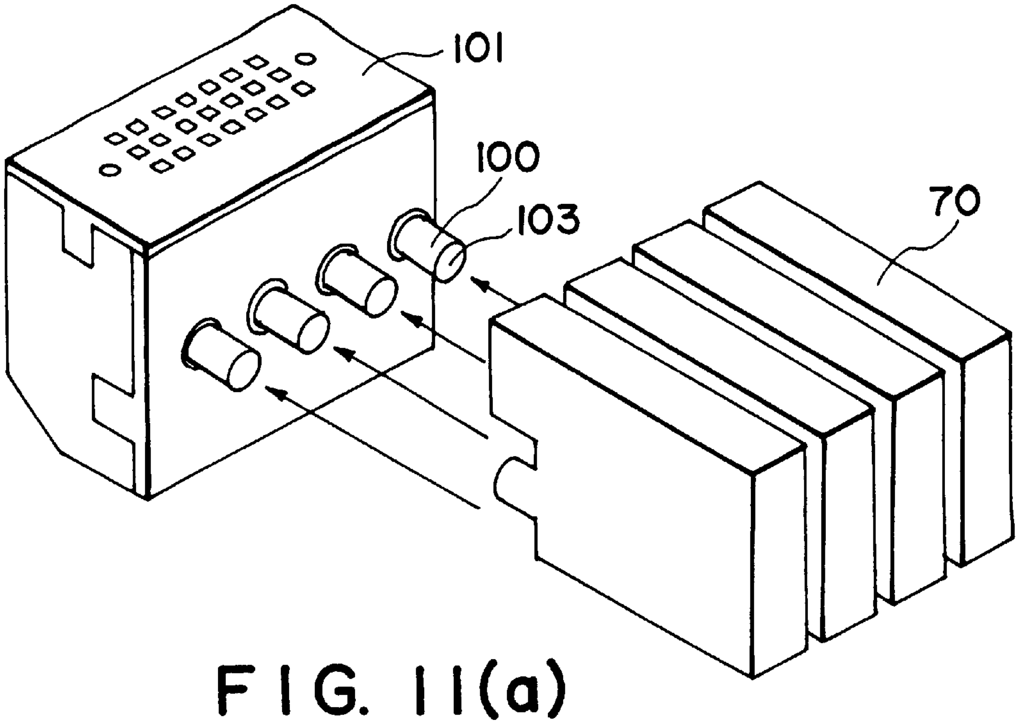
FIG. 11(*a*) is a schematic perspective view showing a recording head to which the ink container of the present invention is connectable, and FIG. 11(*b*) is a schematic sectional view showing a connection state between the ink container and the recording head.
Figure 11B:
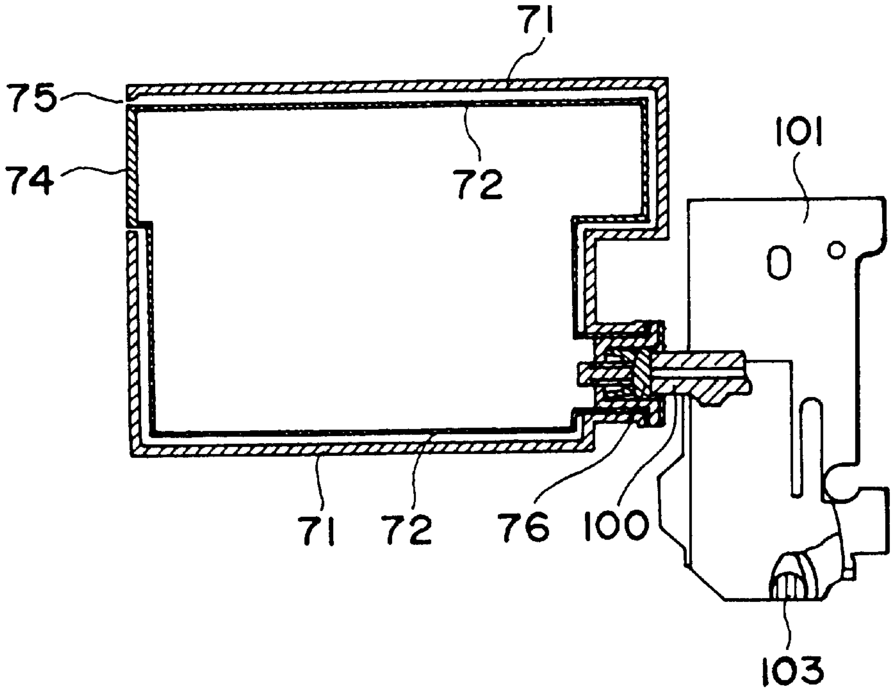

The connection of the ink container to the recording head will be described. FIG. 11, (*a*) is schematic perspective view showing a recording head to which the ink container of the present invention is connectable, and (*b*) is a schematic sectional view showing a connection state between the ink container and the recording head.

In FIG. 11, (*a*), designated by 1 01 is a recording head unit as the recording means, and integrally includes black, yellow, cyan and magenta recording heads to permit full-color printing. Designated by 100 is an ink supply tube as an ink introduction portion for introducing the ink to the respective recording heads, and an end of the ink supply tube 100 is provided with a filter 102 for trapping bubbles or foreign matters. When the above-described ink container 100 is mounted to the recording head unit 101, the ink supply tube 100 is connected to the valve 76 provided in the ink container 70 to permit the ink supply.

After the ink container mounting, the ink is introduced into the recording head from the ink container to establish the ink communication state. Thereafter, during printing operation, the ink is ejected from the ink ejection portion 103 provided in he recording head so that ink in the ink container inner wall is consumed.

In the foregoing, the ink container is disconnectably connectable with the liquid ejection recording head, but it may be integral with the liquid ejection recording head. The liquid to be ejection is not limited to the ink, but may be processing liquid which reacts with the ink on the recording material.

<Recording device>

An ink jet recording apparatus usable with the ink container having the valve of the present invention, will be described.

Figure 12:
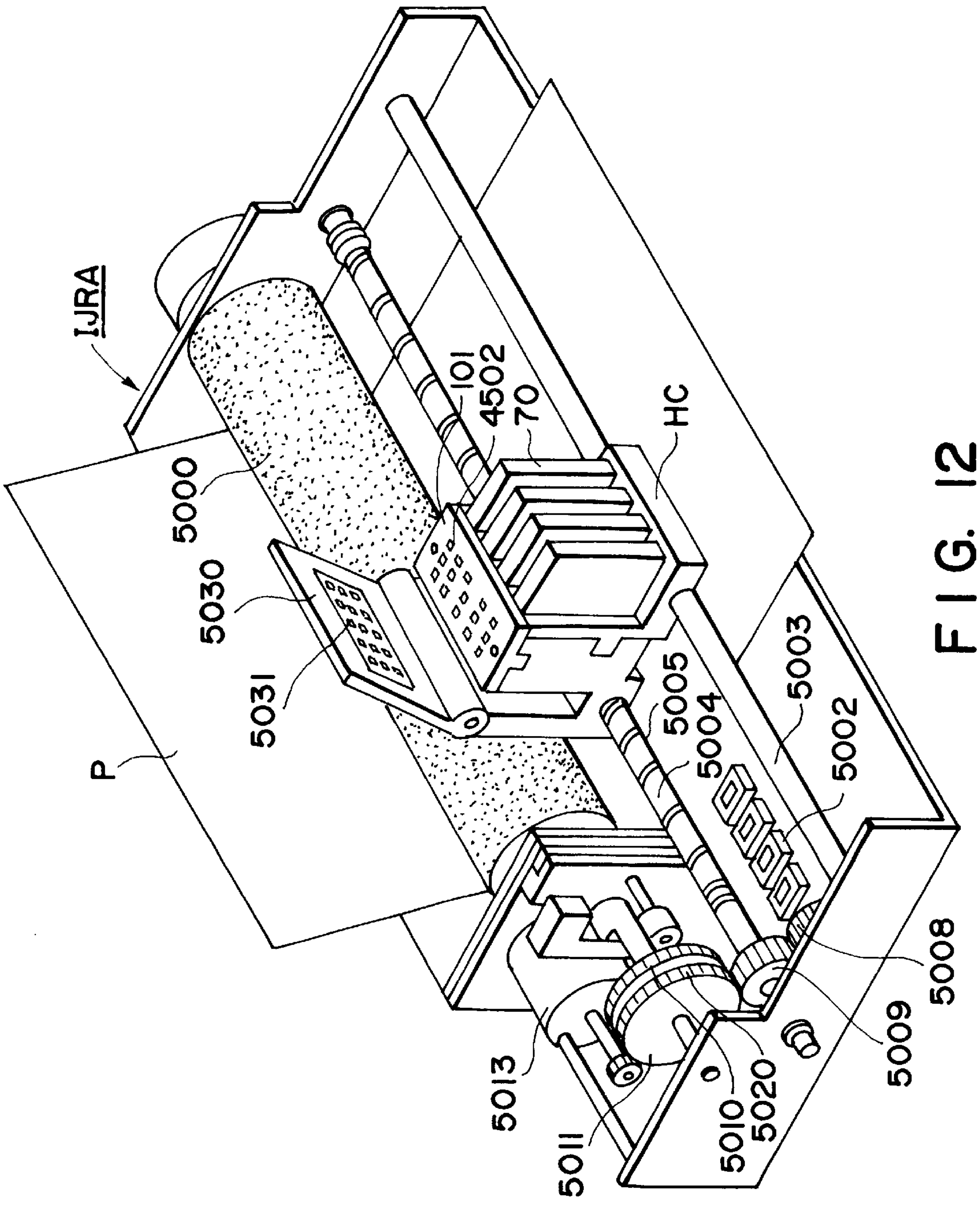
FIG. 12 is a schematic view showing an ink jet recording apparatus carrying an ink container according to an embodiment of the present invention.
Figure 13A:
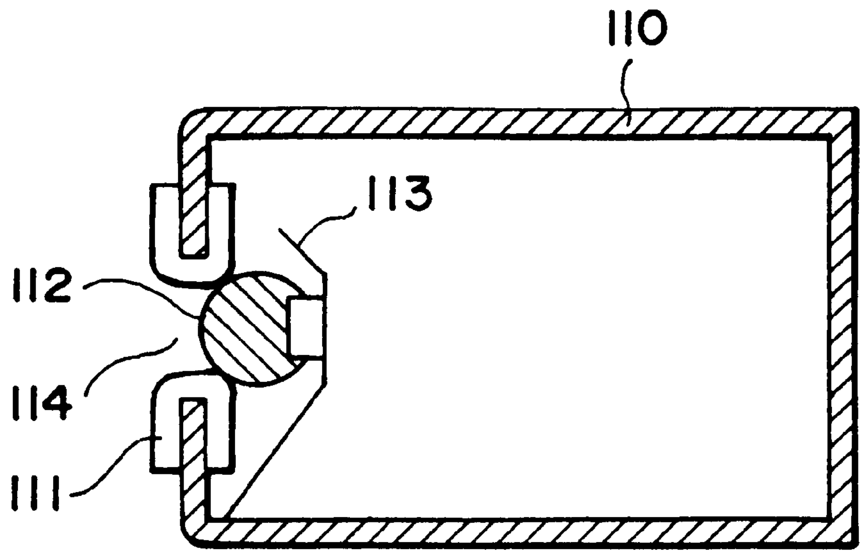
FIGS. 13(*a*) and 13(*b*) are schematic views of conventional valves for an ink container.
Figure 13B:
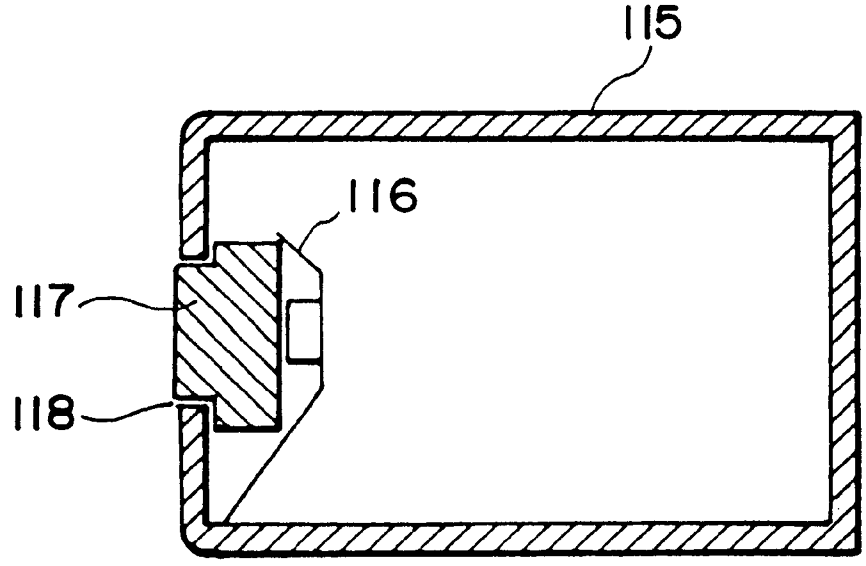

FIG. 12 is a schematic view of an ink jet recording apparatus which is compatible with the ink containers described in the embodiments of the present invention.

In FIG. 12, the head unit 101 and the ink container 70 are securely but removably mounted on the carriage provided on the main assembly side of the ink jet recording apparatus, with the use of an unillustrated positioning means.

The forward and backward rotation of a driving motor 5013 is transmitted to a lead screw 5004 through driving force transmission gears 5011 and 5009, rotating the lead screw 5004. The lead screw 5004 is provided with a helical groove which engages with an unillustrated pin provided on the carriage. With this arrangement, the carriage is reciprocally moved in the e longitudinal direction of the apparatus. A reference numeral 5002 designates a cap for capping the front surface of each recording head within the recording head unit. Also, it is used for restoring the recording head performance, the ink is sucked through the opening of the ca p by an unillustrated sucking means. The ca p 5002 is moved by the driving force transmitted through a gear 5008 and the like, being enabled to cover the ejection surface of each recording head. Adjacent to the cap 5002, an unillustrated cleaning blade is disposed so as to be movable in the vertical direction of the is drawing. The configuration of the blade is not limited to the form depicted in the drawing, and needless to say, any known cleaning blade is compatible with the present invention.

The apparatus is structured so that appropriate operation among the capping, cleaning, and performance recovery sucking operations is performed at a pertinent position by the function of the lead screw 500 5 when the carriage is at its home position, it is also needless to say that any structure is compatible with the present invention as long as the structure can enable a proper operation to be performed with known timing.

When the recording head unit is mounted on the carriage, the connection pad 4502 of the recording head unit is connected to the connection pad 531 of a connection plate 5030 provided on the carriage, whereby electrical connection is established. This connection occurs as the connection pad 50 30 is rotated about its axis. Since this electrical connection is established without using a connector, the recording head is not subjected to unnecessary force.

As described in the foregoing, by using the valve member of the present invention, the improved connection is accomplished between the ink container and the means to be connected therewith such as a recording means. In addition, this is accomplished in the case of a simple opening used in the ink container as the ink supply port.

The use of the press-contact member further improve the connection in that valve member is not disengaged from the valve seat. The use of the press-contact member provides a substantially sealed space in the valve seat.

The use of the valve of the present invention improves the ink supply when the ink container contains an absorbing material adjacent the supply port, since the valve plug member compresses the absorbing material, by which the capillary force is increased there. When the ink accommodating portion has bladder-like structure, the ink path is prevented from being shuts off by the material constituting the bladder sticking to the valve member or the valve seat. When the valve is of the same material as the ink accommodating portion, the ink container can be easily collected for the reuse of the material.

In the foregoing, the description has been made mainly with an ink container having a double wall structure, but the present invention is applicable to an ink container containing an ink absorbing material as a negative pressure producing means, with the same advantageous effects. The configuration of ink container is not limited to the rectangular parallelopiped configuration, and the ink container may be constituted by a plurality of ink containing portions which are integral, to which the valve of the present invention is used for the respective ink containing portions.

While the invention has been described with reference to the structures disclosed herein, it is not confined to the details set forth and this application is intended to cover such modifications or changes as may come within the purposes of the improvements or the scope of the following claims.

What is claimed is:

1. A valve member for a recording liquid supply port connectable with a liquid ejection recording means for supplying recording liquid to said liquid election recording means, comprising:

an elastically deformable plate-like member;

a plug member on one side of said plate-like member adjacent a central portion thereof;

a supporting member provided adjacent a periphery of said plate-like member, said supporting member for supporting said plate-like portion, said supporting member being on said one side thereof;

wherein said plug member has a sealing portion, adjacent a free end portion thereof, for substantially plugging said liquid supply port by being inserted into the liquid supply port, and a liquid feeding portion, away from the free end portion, said liquid feeding portion having a cross-sectional area which is smaller than that of said sealing portion, wherein the cross-sectional area of said liquid feeding portion is in a plane parallel with the liquid supply port; and wherein said valve member is held in a liquid container by meniscus of recording liquid existing between said sealing portion of said plug member and said liquid supply port.

2. A valve member according to claim 1, wherein said plate-like member elastically deforms when it is connected with the recording means, so that sealing portion is inserted into a liquid accommodating portion of the container, by which a liquid flow path is established, and when not connected with the recording means, elastic force of said plate-like member is released, by which the liquid flow path is closed.

3. A valve member according to claim 1, wherein said plug member is extended perpendicularly relative to said plate-like member.

4. A valve member according to claim 1, wherein said liquid feeding portion is provided with a groove for liquid communication.

5. A valve member according to claim 1, wherein at least three of supporting members are provided at different positions, and wherein an angle formed between said plate-like member and a line connecting a gravity center of said plate-like member and a gravity center of a polygonal shape constituted by connecting the different positions, is substantially 90 degrees.

6. A valve member according to claim 5, wherein exactly three of said supporting members are provided.

7. A valve member according to claim 5 or 6, wherein said supporting member is in the form of a projection having a height less than that of said plug member.

8. A valve member according to claim 1, wherein a cross-sectional area of said liquid feeding portion gradually decreases away from a free end of plug member.

9. A valve for a recording liquid supply port connectable with a liquid ejection recording means for supplying recording liquid to said liquid election recording means, comprising:

a valve seat having a connecting portion for connection with said liquid supply port and an opening for supplying liquid to said recording means;

a valve member for substantially plugging said opening of said valve seat;

said valve member including:

an elastically deformable plate-like member;

a plug member on one side of said plate-like member;

a supporting member for supporting said plate-like member on said liquid container, said supporting member being on said one said of said plate-like member;

wherein said plug member has a sealing portion, adjacent a free end portion thereof, for substantially plugging said liquid supply port by being inserted into the liquid supply port, and a liquid feeding portion, away from the free end portion, said liquid feeding portion having a cross-sectional area which is smaller than that of said sealing portion, wherein the cross-sectional area of said liquid feeding Portion is in a plane parallel with the liquid supply port;

wherein said valve member is held in the liquid container by meniscus of recording liquid existing between said sealing portion of said plug member and said liquid supply port.

10. A valve according to claim 9, wherein said valve seat has a recess, and said plate-like member has a size slightly larger than said recess.

11. A valve according to claim 9, wherein said valve seat has a portion for supporting a peripheral portion of said plate-like member.

12. A valve according to claim 9, further comprising a press-contact member of fibrous material covering an outer portion of said valve seat.

13. A valve according to claim 12, wherein said press-contact member comprises two different nonwoven fabric materials which are molded and welded together by ultrasonic welding.

14. A liquid container connectable with a recording means, comprising:

a liquid accommodating portion;

a liquid supply port for supplying liquid to said recording means;

a valve in said liquid supply port;

wherein said valve includes:

a valve seat having a connecting portion for connection with said liquid supply port and an opening for supplying liquid to said recording means; and a valve member for substantially plugging said opening of said valve seat;

wherein said valve member includes:

an elastically deformable plate-like member;

a plug member on one side of said plate-like member;

a supporting member for supporting said plate-like member portion on said liquid container, said supporting member being on said one side of said plate-like member;

wherein said plug member has a sealing portion, adjacent a free end portion thereof, for substantially plugging said liquid supply port by being inserted into the liquid supply port, and a liquid feeding portion, away from the free end portion, said liquid feeding portion having a cross-sectional area which is smaller than that of said sealing portion, wherein the cross-sectional area of said liquid feeding portion is in a plane parallel with the liquid supply port;

wherein said valve member is held in the liquid container by meniscus of sound recording liquid existing between said sealing portion of said plug member and said liquid supply port.

15. A liquid container according to claim 14, further comprising an inner wall for forming a space for accommodating liquid and an outer wall covering said inner wall, wherein an outer side of said inner wall and an inner side of said outer wall are substantially the same configuration, and wherein corner portions of said inner wall are positioned corresponding to corner portions of said outer wall.

16. A liquid container according to claim 14, wherein said valve seat, said valve member and said inner wall are of the same material.

17. A liquid container according to claim 14, wherein said liquid accommodating portion contains liquid.

18. A liquid jet cartridge comprising:

a liquid container as defined in claim 14; and a liquid jet head detachably connected to a liquid supply port of said liquid container.

* * * * *

UNITED STATES PATENT AND TRADEMARK OFFICE
CERTIFICATE OF CORRECTION

PATENT NO. : 5,949,456
DATED : September 7, 1999
INVENTOR(S) : HIDEHISA MATSUMOTO et al.

It is certified that error appears in the above-identified patent and that said Letters Patent is hereby corrected as shown below:

ON THE TITLE PAGE:

Item [56] Reference Cited

U.S. PATENT DOCUMENTS

"5,127,616" should read "5,127,626".

Item [57] ABSTRACT

Line 2, "connected to" should read --connectable with--.

COLUMN 1

Line 12, delete "of an".

Line 14, "a" should read --are--.

Line 29, delete "the" (second occurrence).

Line 52, "is" should read --is a--.

UNITED STATES PATENT AND TRADEMARK OFFICE

CERTIFICATE OF CORRECTION

PATENT NO. : 5,949,456

DATED : September 7, 1999

INVENTOR(S) : HIDEHISA MATSUMOTO et al.

It is certified that error appears in the above-identified patent and that said Letters Patent is hereby corrected as shown below:

COLUMN 2

Line 6, "A" should read --a--.

Line 29, "A" should read --a--.

COLUMN 3

Line 18, "A" should read --a--.

Line 38, "schematic" should read --are schematic--.

Line 60, delete "is a".

COLUMN 4

Line 1, delete "a".

Line 41, "port 73" should read --port 73.--.

UNITED STATES PATENT AND TRADEMARK OFFICE

CERTIFICATE OF CORRECTION

PATENT NO. : 5,949,456
DATED : September 7, 1999
INVENTOR(S) : HIDEHISA MATSUMOTO et al.

It is certified that error appears in the above-identified patent and that said Letters Patent is hereby corrected as shown below:

COLUMN 5

Line 28, delete "g".

COLUMN 7

Line 12, "provided" should read --provided them--.

Line 53, "welding" should read --welded--.

COLUMN 8

Line 1, "materials" should read --material--.

COLUMN 9

Line 35, "FIG. 4 is" should read --FIG. 4 illustrates--.

Line 40, "portions." should read --portion.--.

Line 50, "cases," should read --case,--.

UNITED STATES PATENT AND TRADEMARK OFFICE

CERTIFICATE OF CORRECTION

PATENT NO. : 5,949,456

DATED : September 7, 1999

INVENTOR(S) : HIDEHISA MATSUMOTO et al.

It is certified that error appears in the above-identified patent and that said Letters Patent is hereby corrected as shown below:

COLUMN 10

Line 4, "example;s" should read --examples--.

Line 8, "uncouples" should read --uncoupled--.

Line 10, "form" should read --from--.

Line 46, "low" should read --lower--.

COLUMN 12

Line 35, "S9 04)." should read --S904).--.

Line 37, "S9 05)." should read --S905).--.

Line 60, "as" should read --has--.

Signed and Sealed this

Twenty-first Day of November, 2000

Attest:

Q. TODD DICKINSON

Attesting Officer

Director of Patents and Trademarks

UNITED STATES PATENT AND TRADEMARK OFFICE

CERTIFICATE OF CORRECTION

PATENT NO. : 5,949,456

DATED : September 7, 1999

INVENTORS : HIDEHISA MATSUMOTO et al.

It is certified that error appears in the above-identified patent and that said Letters Patent is hereby corrected as shown below:

COLUMN 13

Line 8, "1 01" should read --101--.

Line 23, "he" should read --the--.

Line 29, "ejection" should read --ejected--.

Line 50, delete "e".

Line 54, "ca" should read --cap--.

Line 55, delete "p" and "ca p" should read --cap--.

Line 67, "500 5" should read --5005--.

COLUMN 14

Line 10, "50 30" should read --5030--.